US012027921B2

(12) United States Patent
Park et al.

(10) Patent No.: US 12,027,921 B2
(45) Date of Patent: Jul. 2, 2024

(54) MOTOR

(71) Applicant: Samsung Electronics Co., Ltd., Suwon-si (KR)

(72) Inventors: Jungwoo Park, Suwon-si (KR); Cheo Park, Suwon-si (KR); Byoungsoo Ko, Suwon-si (KR); Dongbum Lee, Suwon-si (KR); Jonghyun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 16/953,845

(22) Filed: Nov. 20, 2020

(65) Prior Publication Data
US 2021/0167646 A1    Jun. 3, 2021

(30) Foreign Application Priority Data

Nov. 28, 2019    (KR) .................. 10-2019-0155669

(51) Int. Cl.
*H02K 1/27* (2022.01)
*H02K 1/14* (2006.01)
(Continued)

(52) U.S. Cl.
CPC ........... *H02K 1/2791* (2022.01); *H02K 1/146* (2013.01); *H02K 1/187* (2013.01); *H02K 1/2753* (2013.01); *H02K 5/08* (2013.01); *H02K 15/02* (2013.01)

(58) Field of Classification Search
CPC ...... H02K 5/225; H02K 1/2786; H02K 1/146; H02K 3/522; H02K 1/187; H02K 15/02;
(Continued)

(56) References Cited

U.S. PATENT DOCUMENTS

2002/0180304 A1*  12/2002  Knauff ............... H02K 1/30
                                                    310/261.1
2008/0169719 A1*  7/2008  Yu ..................... H02K 1/17
                                                    310/156.08
(Continued)

FOREIGN PATENT DOCUMENTS

EP    1265341    12/2002
EP    1 551 091 A1    7/2005
(Continued)

OTHER PUBLICATIONS

Extended European Search Report dated Sep. 14, 2022 in European Patent Application No. 20891819.3 (9 pages).
(Continued)

*Primary Examiner* — Tran N Nguyen
(74) *Attorney, Agent, or Firm* — STAAS & HALSEY LLP

(57) ABSTRACT

A motor having a compact volume by reducing sizes in axial and radial directions includes a stator, and a rotor arranged outside the stator and rotated by electromagnetically interacting with the stator, wherein the rotor includes a ring-shaped back yoke, a plurality of magnets separately arranged inside of the back yoke along a circumferential direction of the back yoke, and a frame arranged to combine the back yoke and the plurality of magnets, and having an open side through which an outer surface of the back yoke is exposed to an outside of the frame.

12 Claims, 12 Drawing Sheets

(51) Int. Cl.
  *H02K 1/18*    (2006.01)
  *H02K 1/2753*  (2022.01)
  *H02K 1/2791*  (2022.01)
  *H02K 5/08*    (2006.01)
  *H02K 15/02*   (2006.01)

(58) Field of Classification Search
  CPC ........ H02K 21/22; H02K 5/08; H02K 1/2791;
                          H02K 1/2753; H02K 1/28
  See application file for complete search history.

(56) References Cited

U.S. PATENT DOCUMENTS

| | | | |
|---|---|---|---|
| 2010/0320859 A1* | 12/2010 | Himmelmann | H02K 1/28 |
| | | | 310/156.31 |
| 2011/0175479 A1 | 7/2011 | Marchitto et al. | |
| 2014/0294621 A1* | 10/2014 | Narita | H02K 5/128 |
| | | | 417/354 |
| 2016/0329762 A1 | 11/2016 | Li et al. | |
| 2016/0329793 A1 | 11/2016 | Li et al. | |
| 2019/0256203 A1 | 8/2019 | Park | |
| 2019/0264513 A1* | 8/2019 | Kosel | E21B 33/128 |

FOREIGN PATENT DOCUMENTS

| | | |
|---|---|---|
| EP | 2 267 868 A2 | 12/2010 |
| JP | 2003-244883 | 8/2003 |
| JP | 2004-360499 | 12/2004 |
| JP | 2012-228075 | 11/2012 |
| JP | 2014-217161 | 11/2014 |
| JP | 6064859 | 1/2017 |
| JP | 2017-44168 | 3/2017 |
| JP | 2019-68588 | 4/2019 |
| KR | 10-0659595 B1 | 12/2006 |
| KR | 10-2013-0109867 A | 10/2013 |
| KR | 10-1557994 B1 | 10/2015 |
| KR | 10-1622020 B1 | 5/2016 |
| KR | 10-2017-0030020 | 3/2017 |
| KR | 10-1879041 | 8/2018 |
| KR | 10-1904287 | 10/2018 |
| KR | 10-1965512 B1 | 4/2019 |
| KR | 10-2019-0121095 A | 10/2019 |
| WO | 2016/199398 | 12/2016 |

OTHER PUBLICATIONS

International Search Report dated Mar. 30, 2021 in International Patent Application No. PCT/KR2020/016682.
Korean Office Action dated Apr. 11, 2024 for Korean Application No. 10-2019-0155669.
European Office Action dated Feb. 19, 2024 for European Application No. 20891819.3.

* cited by examiner

MOTOR

CROSS-REFERENCE TO RELATED APPLICATIONS

This application is based on and claims priority under 35 U.S.C. § 119 to Korean Patent Application No. 10-2019-0155669 filed on Nov. 28, 2019, the disclosure of which is incorporated herein by reference in its entirety.

BACKGROUND

1. Field

The disclosure relates to an outer rotor motor with a rotor arranged outside a stator.

2. Description of the Related Art

In general, motors are a device for converting electrical energy to mechanical energy.

The motors may be classified by position of the rotor against the stator into outer rotor motors with the rotor placed outside the stator and inner rotor motors with the rotor inside the stator.

The outer rotor motor has a merit of outputting high power as compared to the inner rotor motor having similar dimensions. That is why the outer rotor motor is used in various products required to have a smaller motor.

These days, there are attempts to further reduce the size of the products including motors. Hence, outer rotor motors that are smaller than the conventional outer rotor motor are required.

SUMMARY

The disclosure provides a motor in a reduced size.

The disclosure also provides a motor having reduced sizes in axial and radial directions.

The disclosure also provides a motor having a reduced size in an axial direction by enhancing a wire winding method and a wire supporting structure.

The disclosure also provides a motor having a reduced size in a radial direction by exposing a portion of a back yoke to the outside of the motor.

According to an aspect of the disclosure, a motor includes a stator, and a rotor arranged outside the stator and rotated by electromagnetically interacting with the stator, wherein the rotor includes a ring-shaped back yoke, a plurality of magnets separately arranged inside of the back yoke along a circumferential direction of the back yoke, and a frame arranged to combine the back yoke and the plurality of magnets, and having an open side through which an outer surface of the back yoke is exposed to an outside of the frame.

The back yoke may include a plurality of projections extending from an inner surface of the back yoke toward a center of the back yoke and arranged separately along the circumferential direction of the back yoke.

Each of the plurality of projections may be arranged between the magnets neighboring each other to prevent the magnets from being closer or farther in distance.

Given that length of the back yoke in a radial direction is thickness, thickness of each of the plurality of projections may be smaller than thickness of each of the plurality of magnets.

Given that the thickness of each of the plurality of thickness is $t1$ and the thickness of each of the plurality of magnets is $t2$, the thicknesses may meet the following equation:

$$t2/5 < t1 < t2/2.$$

The rotor may further include a shaft supporting member, to which a shaft corresponding to a rotation axis is inserted and coupled.

The frame may be provided to combine the back yoke, the plurality of magnets, and the shaft supporting member.

The rotor may be integrally formed by injection molding the frame between the back yoke, the plurality of magnets, and the shaft supporting member.

The rotor and the back yoke may have the same outside diameter.

The back yoke may further include a first sticking projection protruding from a top surface or bottom surface of the back yoke in an axial direction.

The frame may further include a second sticking projection protruding in an opposite direction to the first sticking projection from a top surface or bottom surface of the frame to match the first sticking projection.

The first sticking projection and the second sticking projection may be arranged to be interlocked with each other to prevent the back yoke from being rotated relatively to the frame.

The stator may include a stator core, an insulator arranged to cover the stator core, and a plurality of wires wound on the insulator and connected respectively to terminals of phases U, V, and W.

Some of the plurality of wires may be wound from one side of the insulator along an arc-shaped wall formed in a center of the insulator.

Some of the rest of the plurality of wires may be wound from the other side of the insulator along the arc-shaped wall formed in the center of the insulator.

The plurality of wires may include a first wire connecting a coil of U1 phase terminal to a coil of U2 phase terminal, a second wire connecting a coil of V1 phase terminal to a coil of V2 phase terminal, and a third wire connecting a coil of W1 phase terminal to a coil of W2 phase terminal.

The first wire may be wound from one side of the insulator along the arc-shaped wall in a first direction.

The second wire may be wound from the one side of the insulator along the arc-shaped wall in a second direction opposite the first direction.

The third wire may be wound from the other side of the insulator along the arc-shaped wall in the first direction or the second direction.

The first wire may be arranged separately from the second wire in the axial direction to avoid contacting the second wire when the first wire is wound from the one side of the insulator along the arc-shaped wall.

The insulator may include a first bottom wall arranged to support the first wire and a second bottom wall arranged to support the second wire.

The first bottom wall and the second bottom wall may be formed to have a step in the axial direction for the first wire and the second wire to be separated in the axial direction.

According to another aspect of the disclosure, a motor includes a stator including a stator core, an insulator arranged to cover the stator core, and a plurality of wires wound on the insulator and connected respectively to terminals of phases U, V, and W; and a rotor arranged outside the stator and rotated by electromagnetically interacting with the stator, Some of the plurality of wires may be wound from one side of the insulator along an arc-shaped wall formed in a center of the insulator.

Some of the rest of the plurality of wires may be wound from the other side of the insulator along the arc-shaped wall formed in the center of the insulator.

The plurality of wires may include a first wire connecting a coil of U1 phase terminal to a coil of U2 phase terminal, a second wire connecting a coil of V1 phase terminal to a coil of V2 phase terminal, and a third wire connecting a coil of W1 phase terminal to a coil of W2 phase terminal.

The first wire may be wound from one side of the insulator along the arc-shaped wall in a first direction, The second wire may be wound from the one side of the insulator along the arc-shaped wall in a second direction opposite the first direction.

The third wire may be wound from the other side of the insulator along the arc-shaped wall in the first direction or the second direction.

The first wire may be arranged separately from the second wire in the axial direction to avoid contacting the second wire when the first wire is wound from the one side of the insulator along the arc-shaped wall.

According to another aspect of the disclosure, a motor includes a stator including a stator core, an insulator arranged to cover the stator core, and a plurality of wires wound on the insulator and connected respectively to terminals of phases U, V, and W; and a rotor arranged outside the stator and rotated by electromagnetically interacting with the stator, and including a ring-shaped back yoke, an outer surface of the back yoke being exposed to an outside of the rotor, Some of the plurality of wires may be wound from one side of the insulator along an arc-shaped wall formed in a center of the insulator.

Some of the rest of the plurality of wires may be wound from the other side of the insulator along the arc-shaped wall formed in the center of the insulator.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Embodiments and features as described and illustrated in the disclosure are merely examples, and there may be various modifications replacing the embodiments and drawings at the time of filing this application.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or chamber discussed below could be termed a second element, component, region, layer or section without departing from the teachings of the disclosure.

The terms "front", "rear", "upper", "lower", "top", and "bottom" as herein used are defined with respect to the drawings, but the terms may not restrict the shape and position of the respective components.

Embodiments of the disclosure will now be described in detail with reference to accompanying drawings.

Figure 1:
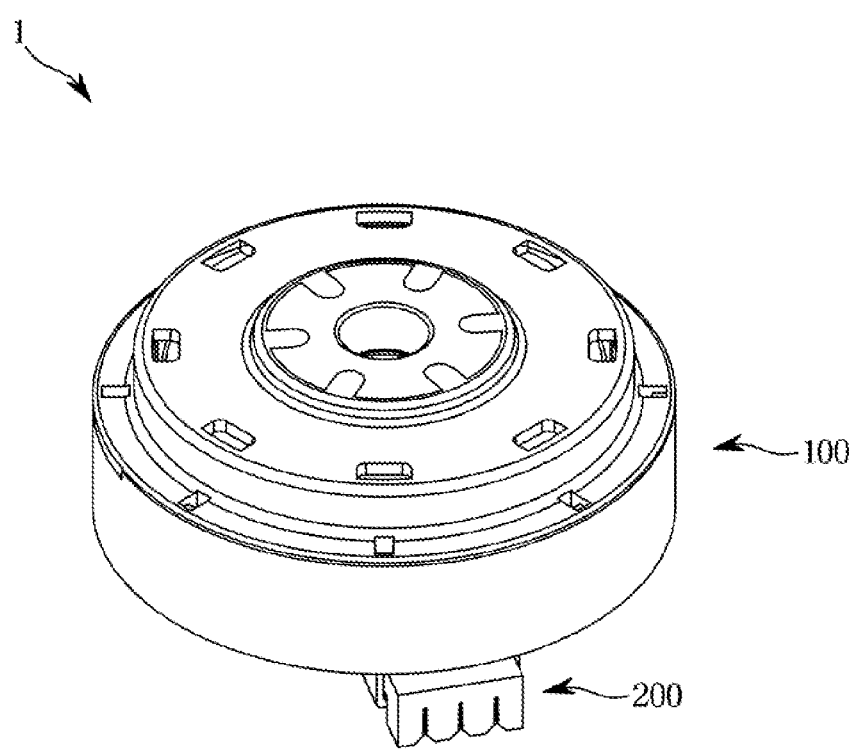
FIG. 1 is a perspective view of a motor, according to an embodiment of the disclosure.

FIG. 1 is a perspective view of a motor, according to an embodiment of the disclosure.

Figure 2:
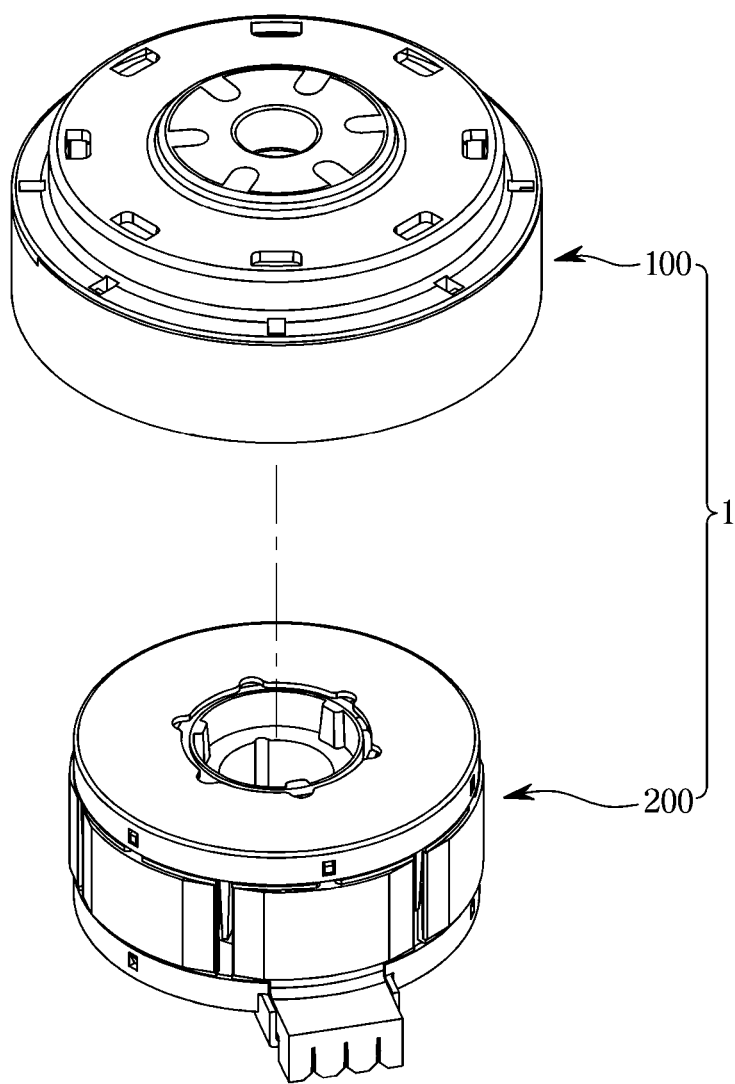
FIG. 2 shows a motor separated into a rotor and a stator, according to an embodiment of the disclosure.

FIG. 2 shows a motor separated into a rotor and a stator, according to an embodiment of the disclosure.

Referring to FIGS. 1 and 2, a motor 1 may include a rotor 100 and a stator 200. The rotor 100 may be configured to be rotated relative to the stator 200. The rotor 100 may be arranged to be rotated by electromagnetic interaction with the stator 200.

In the disclosure, the motor 1 may be an outer rotor motor with the rotor 100 placed outside the stator 200. As compared to an inner rotor motor with a rotor placed inside a stator, the outer rotor motor has a benefit of outputting high power for the motor size. Accordingly, the outer rotor motor is also able to be reduced in size because it is able to output high power with a relatively small size.

Although not shown, the motor 1 may be used in various products. For example, the motor 1 may be used in a compressor of an air conditioner, a compressor of a purifier for supplying cold water, etc., without being limited thereto.

Figure 3:
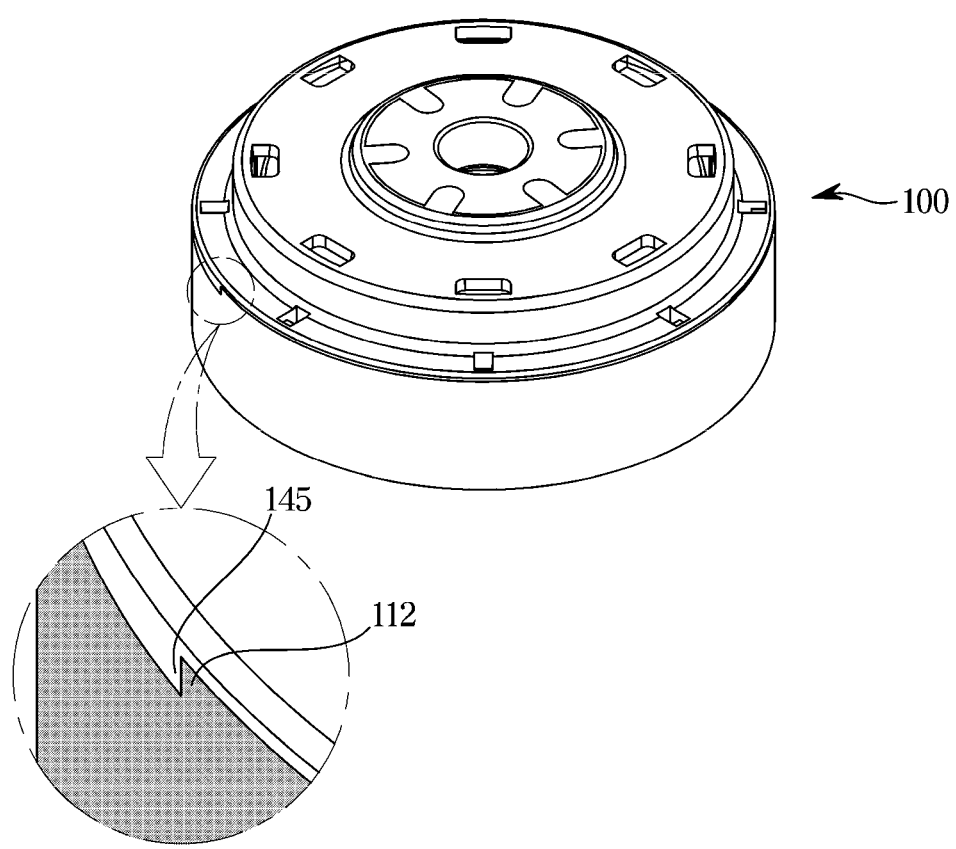
FIG. 3 shows the rotor of FIG. 2.
Figure 4:
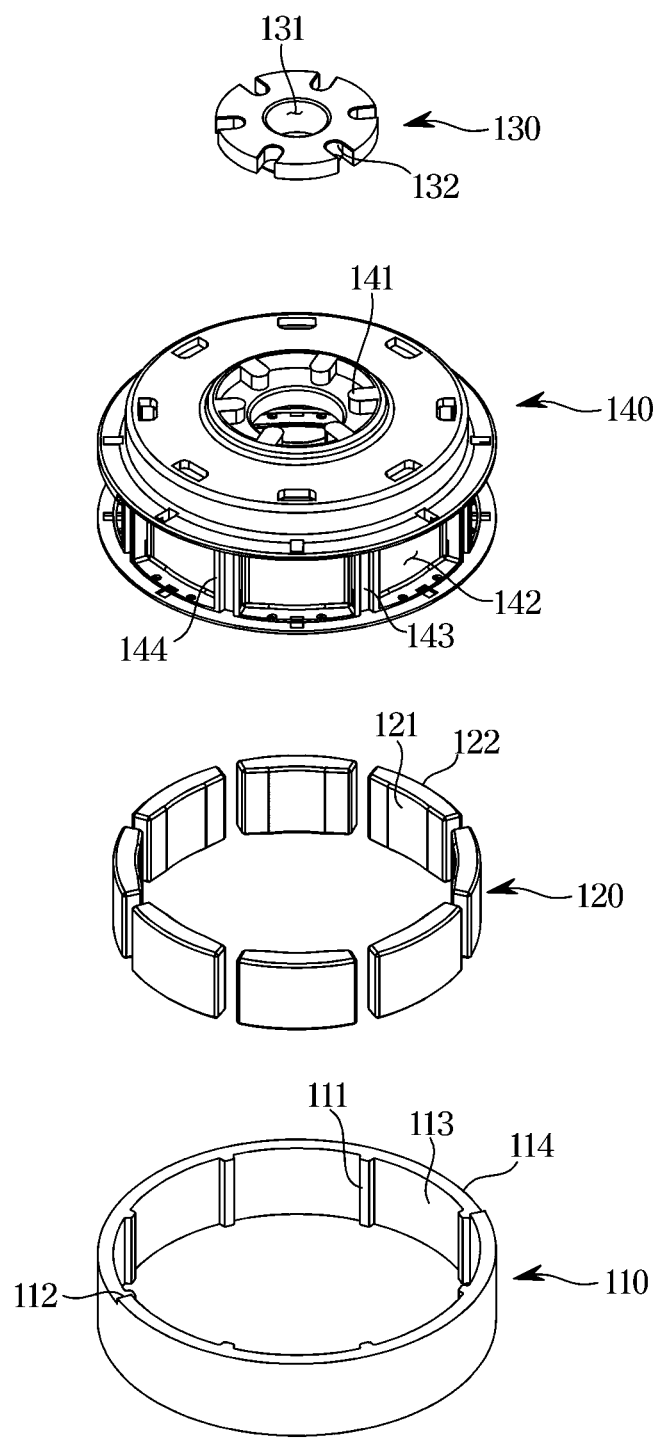
FIG. 4 is an exploded view of the rotor of FIG. 3.
Figure 5:
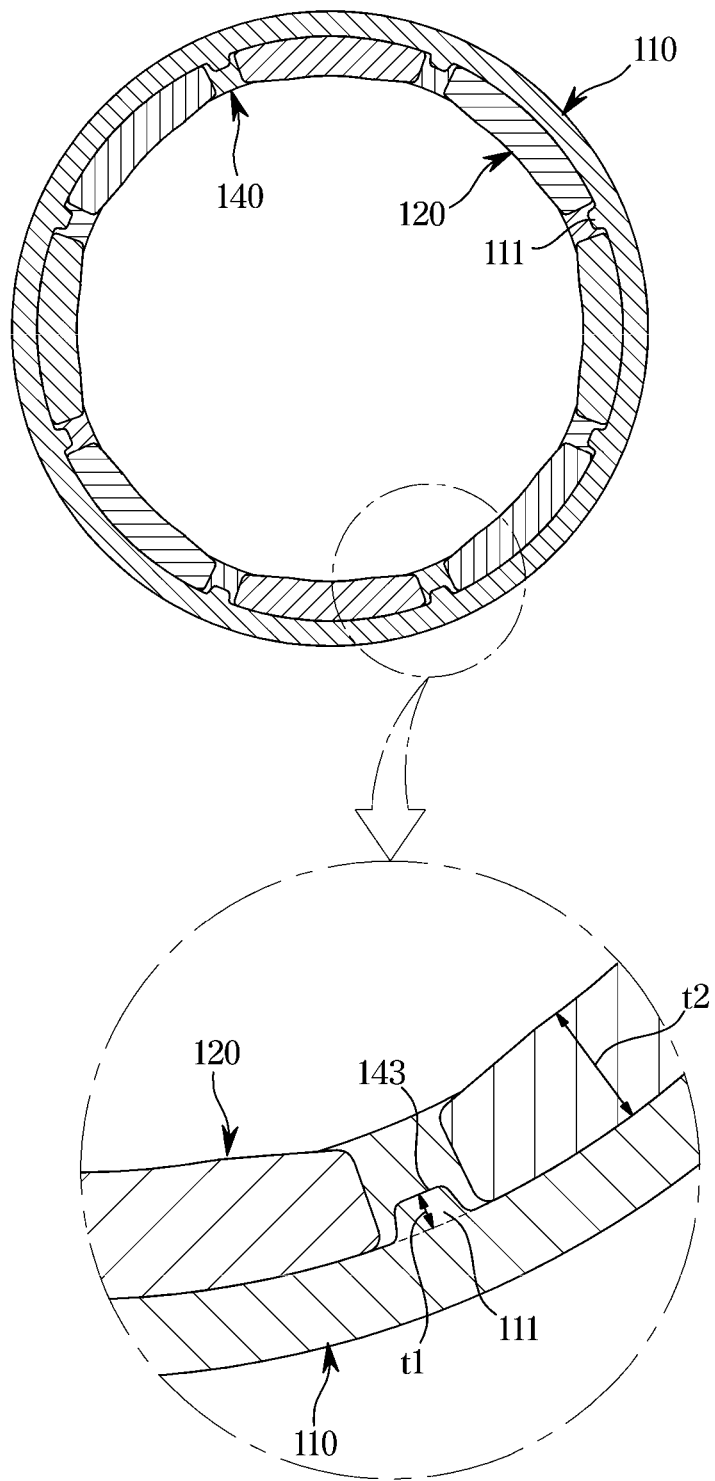
FIG. 5 is a cross-sectional view of the rotor of FIG. 3.

FIG. 3 shows the rotor of FIG. 2. FIG. 4 is an exploded view of the rotor of FIG. 3. FIG. 5 is a cross-sectional view of the rotor of FIG. 3.

Referring to FIGS. 3 and 4, the rotor 100 may include a back yoke 110, magnets 120 arranged inside the back yoke 10, a shaft supporting member 130, to which a shaft (not shown) is inserted, and a frame 140.

The rotor 100 may include the back yoke 110 shaped like a ring that encloses a stator core 200. In the disclosure, the back yoke 110 may be formed in one piece. In other words, the back yoke 110 may be manufactured into a single body without discontinuity along the circumference of the back yoke 110. Accordingly, this may reduce a core loss that may occur from the back yoke 110.

Furthermore, the number of manufacturing processes and material costs may be reduced when the back yoke 110 is manufactured. So far, a back yoke has been manufactured by bending an iron plate into a ring and welding the separated ends of the iron plate. Alternatively, the back yoke has been manufactured by bending an iron plate into a ring, forming grooves at an end of the iron plate and projections at the other end, and fitting them together. In the case of the back yoke resulting from these manufacturing methods, the back yoke is not formed in one piece, which causes a core loss and an increase in the number of manufacturing processes and material cost of the back yoke.

In the disclosure, the back yoke 110 may be manufactured by pressing a magnetic steel sheet to a predetermined thickness and then blanking the magnetic steel sheet in the predetermined thickness. Furthermore, the back yoke 110 and the stator core 210, which will be described later, may be manufactured from a single basic substance. Specifically, the single basic substance may be pressed into an iron plate of a predetermined thickness, and both the back yoke 110 and the stator core 210 may be manufactured concurrently by blanking the iron plate. An iron plate that went through blanking may not usually be reused, so manufacturing the back yoke and the stator core from a single iron plate may have a reduced material cost and reduced number of manufacturing processes as compared to manufacturing them with different iron plates. According to the disclosure, the material cost may be reduced and productivity may be improved.

The back yoke 110 may include a projection 111 protruding from the inner surface of the back yoke 110 toward the center of the back yoke 110. There may be a plurality of projections 111. The plurality of projections 111 may be separately arranged along the circumference of the back yoke 110. The projections 111 may temporarily fix positions of the magnets 120 before the frame 140 is injection molded. The projections 111 may also prevent the distance between the magnets 120 from increasing or decreasing during rotation of the rotor 100. In other words, the projections 111 may fix the magnets 120 to prevent positions of the magnets 120 from being changed.

The back yoke 110 may include a first sticking projection 112 to prevent relative rotation of the back yoke 110 to the frame 140. The first sticking projection 112 may be placed to be interlocked with a second sticking projection 145 arranged on the frame 140, thereby preventing the relative rotation between the back yoke 110 and the frame 140.

The magnets 120 may be arranged inside the back yoke 110. The magnets 120 may be arranged such that the outer surface adjoins the inner surface of the back yoke 110. There may be a plurality of magnets 120. The plurality of magnets 120 may be arranged separately along the circumference of the back yoke 110. Although there are eight magnets 120 shown, the number of magnets is not limited thereto. The number of magnets 120 may be more or fewer than eight.

The shaft supporting member 130 may include a shaft hole 131 provided for a shaft (not shown) to be inserted thereto. The shaft supporting member 130 may also include an anti-rotation groove 132 to prevent relative rotation against the frame 140. There may be a plurality of anti-rotation grooves 132. The plurality of anti-rotation grooves 132 may be arranged separately along the circumference of the shaft supporting member 130.

The frame 140 may be provided to combine the back yoke 110, the magnets 120, and the shaft supporting member 130. The frame 140 may be formed by injection molding. The rotor 100 may be provided by injection molding the frame 140 after the back yoke 110, the magnets 120, and the shaft supporting member 130 are placed in a mold. Specifically, the rotor 100 may be formed by injecting resin (not shown) to form the frame 140 after the back yoke 110, the magnets 120, resin may be injected thereto to form a frame 140 and the shaft supporting member 130 are inserted to an injection mold. With this manufacturing method, the rotor 100 may be integrally formed without an extra fastening member or adhesive member. In other words, the frame 140 may combine the back yoke 110, the magnets 120, and the shaft supporting member 130 even without an extra fastening member or adhesive member.

The frame 140 may be formed with a plastic substance that may be injection molded unlike the back yoke 110, the magnets 120, and the shaft supporting member 130 formed with metal substances. As the frame 140 is formed with the plastic substance, weight of the rotor 100 and thus the weight of the motor 1 including the rotor 100 may be reduced. Furthermore, with the frame 140 formed with the plastic substance, flux leakage due to the frame 140 may be reduced. Otherwise, when the frame is formed with metal, there is flux leakage occurring due to the metal frame.

The frame 140 may include an anti-rotation projection 141 arranged to match the anti-rotation groove 132 of the shaft supporting member 130. The anti-rotation projection 141 may be arranged to be inserted to the anti-rotation groove 132, thereby enabling the frame 140 and the shaft supporting member 130 to be rotated not relatively but together in unison.

The magnet 120 may include an inner surface 121 facing the center of the back yoke 110 and an outer surface 122 facing an inner surface 113 of the back yoke 110. The magnet 120 may be provided such that the outer surface 122 is larger than the inner surface 121.

The frame 140 may include a magnet hole 142 provided for the magnet 120 to be inserted thereto. The inner surface 121 of the magnet 120 may be inserted into the magnet hole 142. The outer surface 122 of the magnet 120 may be provided to be larger than the magnet hole 142. Accordingly, the inner surface 121 of the magnet 120 may be arranged to be exposed to the inside of the frame 140 through the magnet hole 142.

The frame 140 may include a groove 143 provided for the projection 111 of the back yoke 110 to be inserted thereto, and a column 144 with the groove 143 formed thereon. There may be a plurality of columns 144. The columns 144 may be arranged separately along the circumference of the frame 140. The magnet hole 142 may be formed between the neighboring columns 144. The grooves 143 may be formed on the respective columns 144. The groove 143 may have the form to match the projection 111.

The column 144 may be formed between the neighboring magnets 120. In other words, the column 144 may be placed between magnets 120. The column 144 may prevent a gap between the magnets 120 from being narrowed by centrifugal force while the rotor 100 is rotated at high speed. Similar to the column 144, the projection 111 of the back yoke 110 may be arranged between the magnets 120 to prevent the distance between the magnets 120 from increasing or decreasing.

Referring to FIG. 3, the frame 140 may include the second sticking projection 145. The second sticking projection 145 may be arranged to be interlocked with the first sticking projection 112. The first sticking projection 112 and the second sticking projection 145 may protrude in opposite directions to be coupled together along the circumference of the back yoke 110. The first sticking projection 112 and the second sticking projection 145 may be arranged to be interlocked together, thereby preventing relative rotation between the back yoke 110 and the frame 140.

In the disclosure, the outer surface 114 of the back yoke 110 may be exposed to the outside of the frame 140. Specifically, the outer surface 114 of the back yoke 110 may be exposed to the outside of the frame 140, defining the side of the rotor 100. Accordingly, the rotor 100 and the back yoke 110 may have the same outside diameter. In the disclosure, as the motor 1 is the outer rotor motor 1 with the rotor 100 placed outside the stator 200, the size of the outside diameter of the motor 1 may be the same as the size of the back yoke 110. In the disclosure, structures otherwise arranged on the outer surface of the back yoke 110 are removed to fix the back yoke 110, leading to reduction in size of the motor 1 in the radial direction.

Some conventional motors use an extra adhesive to combine the back yoke and the magnet. These motors may have assembly tolerances due to the use of the adhesive. Furthermore, when the motor is used in a compressor for cold air conditioning, refrigerant or oil in the compressor may react with the adhesive and thus cause a fault. Hence, the use of such motors that use an adhesive is restricted in various environments. In the disclosure, the motor 1 may be used even in the compressor that uses refrigerant or oil because the motor 1 combines the back yoke 110 and the magnet 120 without an extra adhesive. Accordingly, the motor 1 in accordance with the disclosure may be used in various environments.

Referring to FIG. 5, thickness t1 of the projection 111 of the back yoke 110 may be smaller than thickness t2 of the magnet 120. The length of the projection 111 in the radial direction of the back yoke 110 is the thickness t1 of the projection 111, and the length of the magnet 120 in the radial direction of the back yoke 110 is the thickness t2 of the magnet 120. In this case, the thickness t1 of the projection 111 may be smaller than the thickness t2 of the magnet 120.

When the thickness t1 of the projection 111 becomes larger than necessary, the projection 111 that is formed with a metal substance may disturb flows of magnetic flux between the neighboring magnets 120. On the contrary, when the thickness t1 of the projection 111 is too small, the projection 111 has difficulty in fixing the position of the magnet 120 when inserted to a mold for injection molding the frame 140. Hence, the thickness t1 of the projection 111 needs to be set suitably.

In an embodiment of the disclosure, the thickness t1 of the projection 111 and the thickness t2 of the magnet 120 may satisfy the following equation:

$$t2/5 < t1 < t2/2.$$

When the equation is met, the projection 111 may fix the position of the magnet 120 without excessively disturbing the flows of magnetic flux between the magnets 120.

Figure 6:
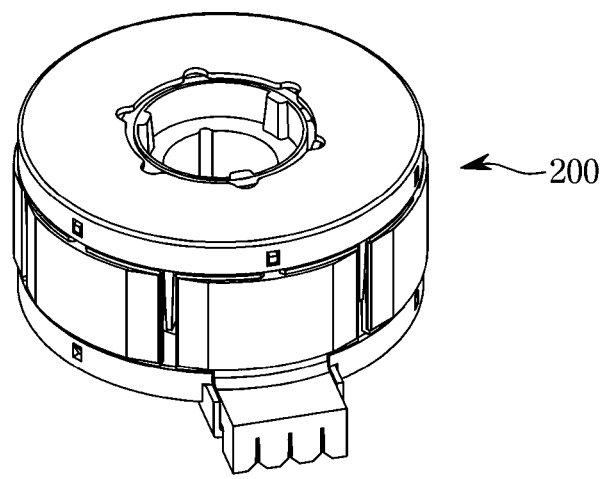
FIG. 6 shows the stator of FIG. 2.
Figure 7:
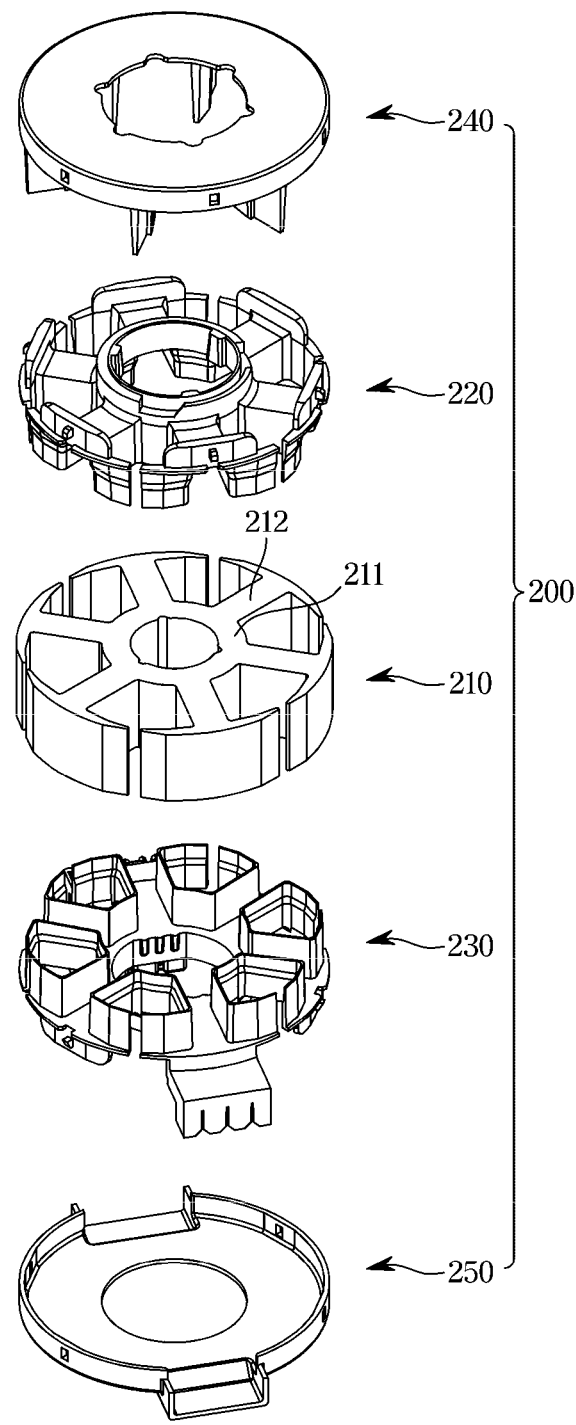
FIG. 7 is an exploded view of the stator of FIG. 6.

FIG. 6 shows the stator of FIG. 2. FIG. 7 is an exploded view of the stator of FIG. 6.

Referring to FIGS. 6 and 7, a structure of the stator according to an embodiment of the disclosure will now be described in detail.

In an embodiment of the disclosure, the stator 200 may include the stator core 210, a first insulator 220 coupled to an upper portion of the stator core 210, a second insulator 230 coupled to a lower portion of the stator core 210, a first housing 240 coupled to the top of the first insulator 220 and a second housing 250 coupled to the bottom of the second insulator 230.

The stator core 210 may include a ring-shaped core 211 and a plurality of teeth 212 extending radially from the core 211. As described above, the stator core 210 may be manufactured from the same basic substance as the back yoke 110 by simultaneously blanking the basic substance with a press. Accordingly, the material cost may be reduced and productivity may be improved by reducing the number of manufacturing processes.

In an embodiment of the disclosure, the stator core 210 may include six teeth 212. The first to third teeth 212 may be respectively assigned terminals of phases U1, V1, W1, and the fourth to sixth teeth 212 may be respectively assigned terminals of phases U2, V2, W2. This will be described later.

The first insulator 220 and the second insulator 230 may be coupled to the upper portion and the lower portion of the stator core 210 with the stator core 210 placed in between. The first insulator 220 and the second insulator 230 may be coupled to each other to cover the top and the bottom of the stator core 210.

Once the first insulator 220 and the second insulator 230 are coupled to each other, a coil (see FIG. 8) may be wound around the teeth 212 of the stator core 210. This will be described in more detail later.

The first insulator 220 and the second insulator 230 may be formed with an insulation material. For example, the first insulator 220 and the second insulator 230 may be an injection molded product. The coil may be wound on the first insulator 220 and the second insulator 230, which cover the teeth 212. The first insulator 220 and the second insulator 230 may cover the teeth 212 to prevent the coil from directly contacting the stator core 210.

The first housing 240 and the second housing 250 may be provided to respectively cover the first insulator 220 and the second insulator 230 from the top and from the bottom. The first housing 240 and the second housing 250 may cover the first insulator 220 and the second insulator 230 to prevent foreign materials from being brought to the coil arranged inside the housings 240 and 250.

The terms "upper portion" or "top" and "lower portion" or "bottom" are mentioned based on FIGS. 6 and 7, and the forms and positions of the elements are not limited by the terms.

Figure 8:
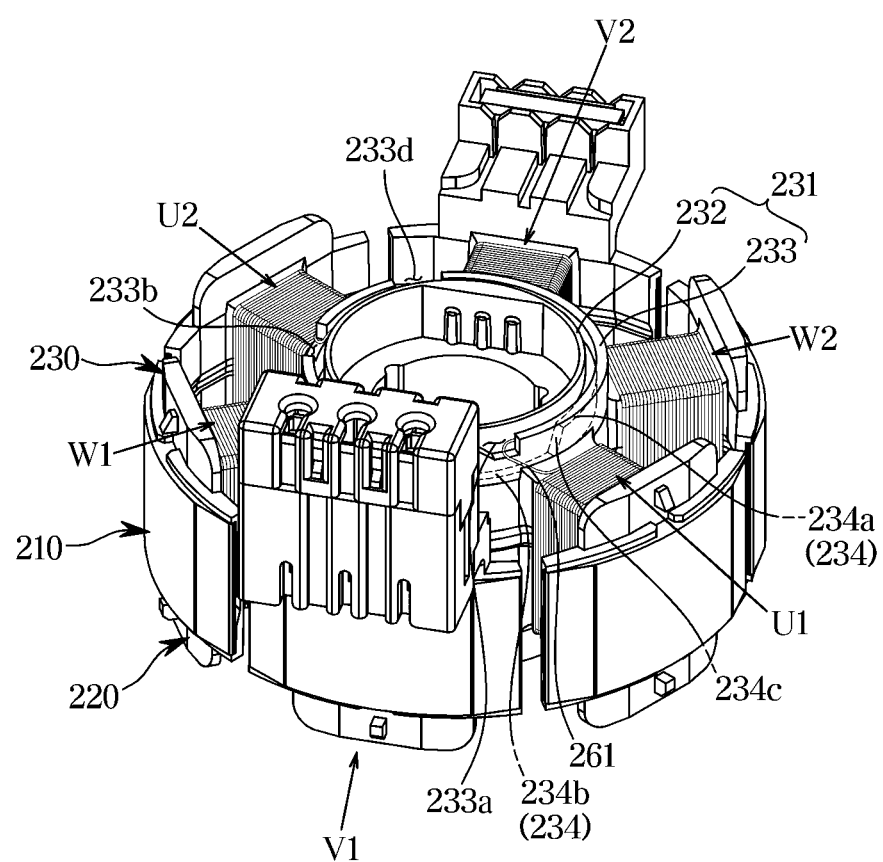
FIG. 8 shows a wire connecting between a first phase and a second phase in a motor viewed at a first angle, according to an embodiment of the disclosure.
Figure 9:
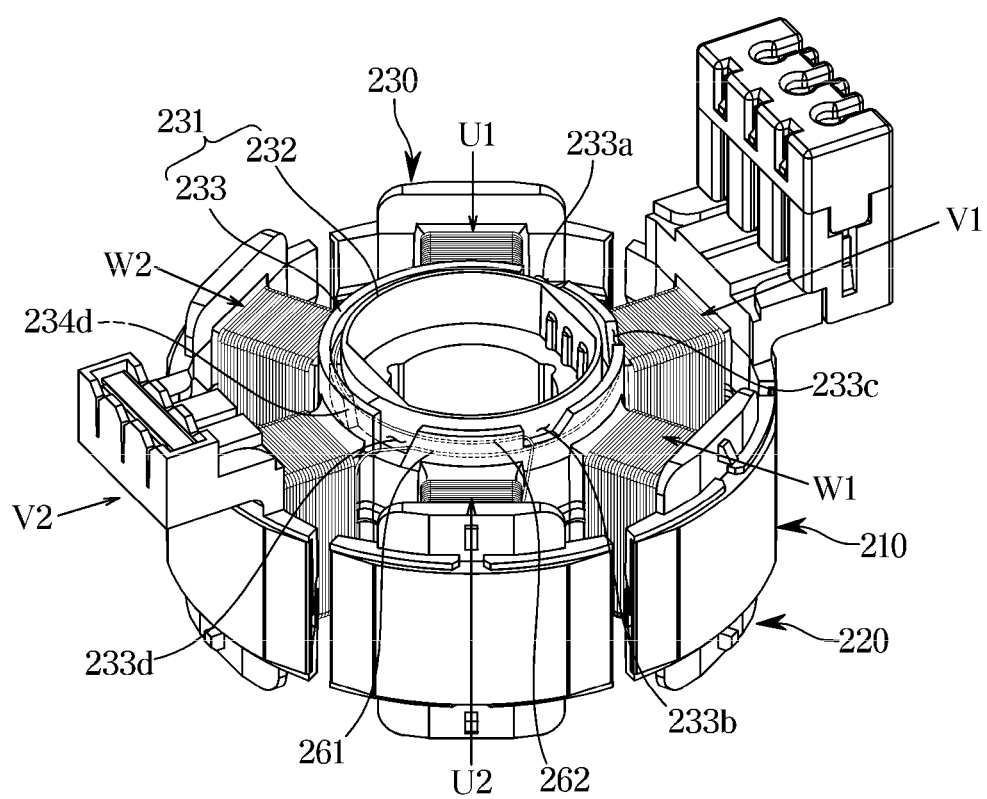
FIG. 9 shows a wire connecting between a first phase and a second phase in a motor viewed at a second angle, according to an embodiment of the disclosure.
Figure 10:
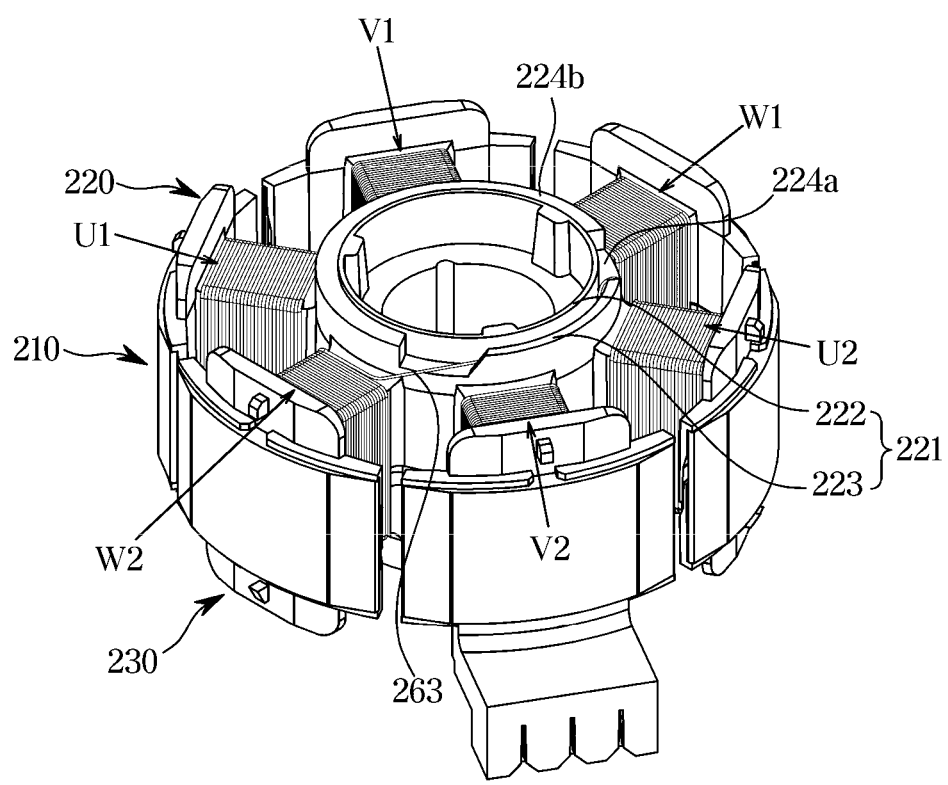
FIG. 10 shows a wire connecting between a first phase and a second phase in a motor viewed at a third angle, according to an embodiment of the disclosure.

FIG. 8 shows a wire connecting between a first phase and a second phase in a motor viewed at a first angle, according to an embodiment of the disclosure. FIG. 9 shows a wire connecting between a first phase and a second phase in a motor viewed at a second angle, according to an embodiment of the disclosure. FIG. 10 shows a wire connecting between a first phase and a second phase in a motor viewed at a third angle, according to an embodiment of the disclosure.

Referring to FIGS. 8 and 10, a wire winding method and arrangement according to an embodiment of the disclosure will now be described in detail.

FIGS. 8 and 9 show the stator 200 with the second insulator 230 located on the top and the first and second housings 240 and 250 left out. FIG. 10 shows the stator 200 with the first insulator 220 located on the top and the first and second housings 240 and 250 left out.

Referring to FIGS. 8 to 10, the stator 200 may include a wire 260 defining the coil.

In an embodiment of the disclosure, phase U may have phase U1 and phase U2 connected in series, phase V may have phase V1 and phase V2 connected in series, and phase W may have phase W1 and phase W2 connected in series. The wire 260 may include a first wire connecting between the phase U1 and the phase U2, a second wire connecting between the phase V1 and the phase V2, and a second wire connecting between the phase W1 and the phase W2.

The first wire 261 to the third wire 263 are required not to contact each other. This is because contact between two or more of the first wire 261 to the third wire 263 blocks formation of a three phase circuit. Hence, the first wire 261 to the third wire 263 are required not to come into contact at all to secure electrical reliability.

In a conventional method, a structure extending in the axial direction of a shaft (not shown) is arranged at the insulator or the housing to prevent contact between wires. Contact between the wires may be prevented by winding the respective wires on the structure at different heights. In the conventional method, however, length of the stator in the axial direction becomes thick due to the structure. When the stator has large thickness in the axial direction, the size of the motor in the axial direction increases as well, and thus there is a limit to reduction in size of the motor.

In the disclosure, thickness of the motor in the axial direction may be reduced by enhancing the wire winding method and wire supporting structure.

In the disclosure, the first wire 261 and the second wire 262 may connect the first phase to the second phase through a second core part 231 of the second insulator 230, and the third wire 263 may connect the first phase to the second phase through a first core part 221 of the first insulator 220. The first insulator 220 may include the first core part 221 provided to cover the core 211 of the stator core 210 from one side of the stator core 210, and the second insulator 230 may include the second core part 231 provided to cover the core 211 of the stator core 210 from the other side of the stator core 210.

A first direction in which the first wire 261 is wound on the second core part 231 when the first wire 261 is wound from the phase U1 to the phase U2, and a second direction in which the second wire 262 is wound on the second core part 231 when the second wire 261 is wound from the phase V1 to the phase V2 may be opposite to each other. For example, the first direction may be a counterclockwise direction while the second direction may be a clockwise direction. Alternatively, the first direction may be a clockwise direction while the second direction may be a counterclockwise direction.

The first core part 221 may include a first inner wall 222 and a first outer wall 223. This will be described later.

The second core part 231 may include a second inner wall 232 and a second outer wall 233. The second inner wall 232 may be provided to have no protruding or concave portion in the axial direction. The second outer wall 233 may include a groove formed by being sunken in the axial direction. Specifically, the second outer wall 233 may include a first groove 233a, a second groove 233b, a third groove 233c, and a fourth groove 233d.

The first wire 261 or the second wire 261 may be inserted to the first to fourth grooves 233a, 233b, 233c, and 233d. The first wire 261 drawn from the phase U1 may be inserted to the first groove 233a. The first wire 261 drawn from the phase U1 and entering to the phase U2 may be inserted to the second groove 233b. The second wire 262 drawn from phase V1 may be inserted to the third groove 233c. The second wire 262 drawn from the phase V1 and entering to the phase V2 may be inserted to the fourth groove 233d.

Referring to FIGS. 8 and 9, the first wire 261 inserted to the first groove 233a may extend counterclockwise along the second core part 231. After the first wire 261 drawn from the phase U1 is inserted to the first groove 233a, the first wire 261 may extend counterclockwise through a space between the second inner wall 232 and the second outer wall 233. The first wire 261 extending counterclockwise along the second core part 231 may be inserted to the second groove 233b, and then wound on the insulators 220 and 230 to form a coil of the phase U2.

Referring to FIGS. 8 and 9, the second wire 262 inserted to the third groove 233c may extend clockwise along the second core part 231. After the second wire 262 drawn from the phase V1 is inserted to the third groove 233c, the second wire 262 may extend clockwise through the space between the second inner wall 232 and the second outer wall 233. The second wire 262 extending clockwise along the second core part 231 may be inserted to the fourth groove 233d, and then wound on the insulators 220 and 230 to form a coil of the phase V2.

As described above, a direction in which the first wire 261 extending from the phase U1 to the phase U2 is wound on the second core part 231, and a direction in which the second wire 262 extending from the phase V1 to the phase V2 is wound on the second core part 231 may be opposite to each other. This may reduce area in the second core part 231 where the first wire 261 and the second wire 261 vertically overlap each other.

Referring to FIGS. 8 and 9, the first wire 261 and the second wire 262 wound on the second core part 231 clockwise or counterclockwise may be arranged separately in the vertical direction. In other words, even when there is an area where the first wire 261 and the second wire 262 vertically overlap each other, the first wire 261 and the second wire 262 may not contact each other because they are arranged separately in the vertical direction.

The second core part 231 may include a bottom wall 234. The second core part 231 including the second inner wall 232, the second outer wall 233, and the bottom wall 234 may have the form of a circular rib with the top open.

The bottom wall 234 of the second core part 231 may include a first bottom wall 234a and a second bottom wall 234b for the first wire 261 and the second wire 262 wound on the second core part 231 to be separately arranged in the vertical direction without contacting each other.

The first bottom wall 234a and the second bottom wall 234b may be arranged at different locations in the axial direction. In other words, the first bottom wall 234a and the second bottom wall 234b may be located at different heights. Accordingly, connection walls 234c and 234d may be provided between the first bottom wall 234a and the second bottom wall 234b to connect the first bottom wall 234a and the second bottom wall 234b.

In an embodiment of the disclosure, the first bottom wall 234a may be located higher than the second bottom wall 234b. The first bottom wall 234a may be provided to support the first wire 261. The second bottom wall 234b may be provided to support the second wire 262. With this structure, the first wire 261 may be wound on the second core part 231 at a higher location than the second wire 262 without contacting the second wire 262. As described above, the first wire 261 may be wound on the second core part 231 counterclockwise. Likewise, the second wire 262 may be wound on the second core part 231 at a lower location than the first wire 261 without contacting the first wire 261. The second wire 262 may be wound on the second core part 231 clockwise.

Referring to FIG. 10, the first core part 221 may include the first inner wall 222 and the first outer wall 223. In FIG. 10, The first outer wall 223 may have the form of an arc according to an embodiment of the disclosure. The first inner wall 222 may be provided to have the form of a ring-shaped rib. The first outer wall 223 may include a first groove 223a and a second groove 223b.

The third wire 263 may be inserted to the first groove 223a and the second groove 223b of the first outer wall 223. The third wire 263 drawn from the phase W1 may be inserted to the first groove 223a. The third wire 263 drawn from the phase W1 and entering to the phase W2 may be inserted to the second groove 223b.

Referring to FIG. 10, the third wire 263 inserted to the first groove 223a may extend clockwise along the first core part 221. The term 'clockwise' is used based on FIG. 10, which may appear to be counterclockwise based on FIGS. 8 and 9. After the third wire 263 drawn from the phase W1 is inserted to the first groove 223a, the third wire 263 may extend clockwise through a space between the first inner wall 222 and the first outer wall 223. The third wire 263 extending clockwise along the first core part 221 may be inserted to the second groove 223b, and then wound on the insulators 220 and 230 to form a coil of the phase W2.

As shown in FIG. 10, only the third wire 263 may be wound on the first core part 221 of the first insulator 220. Accordingly, as the third wire 263 is safe from contact with other wires, the first core part 221 may not include bottom walls of different heights. In an embodiment of the disclosure, however, the first core part 221 may include a first bottom wall 224a supporting the third wire 263 and a second bottom wall 224b located at a higher position than the first bottom wall 224a. In this case, the second bottom wall 224b is provided not to place the third wire 263 separately from other wires in the vertical direction but to reinforce strength of the first core part 221. Accordingly, unlike what is shown in the drawings, it is also possible for the first core part 221 to include the first bottom wall 224a only.

Figure 11:
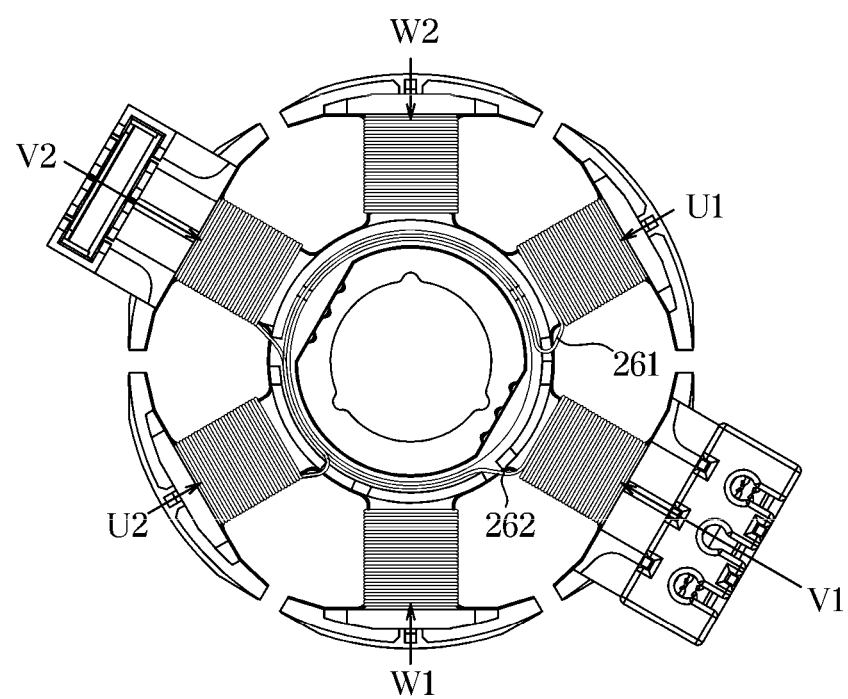
FIG. 11 shows a wire connecting between a first phase and a second phase in a motor viewed at a fourth angle, according to an embodiment of the disclosure.
Figure 12:
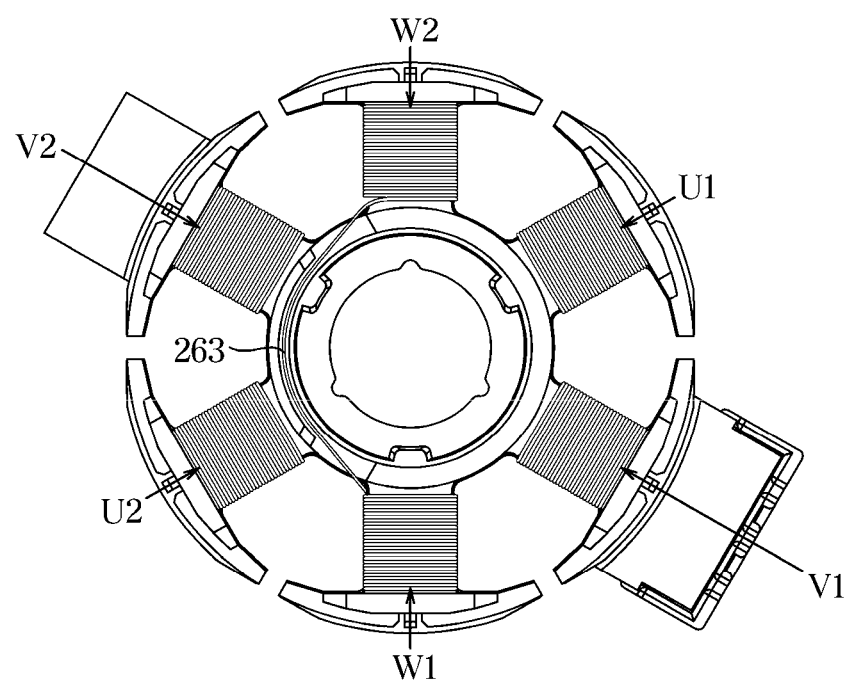
FIG. 12 shows a wire connecting between a first phase and a second phase in a motor viewed at a fifth angle, according to an embodiment of the disclosure.

FIG. 11 shows a wire connecting between a first phase and a second phase in a motor viewed at a fourth angle, according to an embodiment of the disclosure. FIG. 12 shows a wire connecting between a first phase and a second phase in a motor viewed at a fifth angle, according to an embodiment of the disclosure.

FIG. 11 is a top view of the second insulator 230, and FIG. 12 is a top view of the first insulator 220.

What are described above will be further described with reference to FIGS. 11 and 12.

Referring to FIG. 11, the first wire 261 may be wound counterclockwise along the space between the second outer wall 233 and second inner wall 232 of the second core part 231 when extending from the phase U1 to the phase U2. The second wire 262 may be wound clockwise along the space between the second outer wall 233 and second inner wall 232 of the second core part 231 when extending from the phase V1 to the phase V2. Accordingly, an area where the first wire 261 and the second wire 262 overlap in the vertical direction may be minimized, as shown in FIG. 11.

Referring to FIG. 12, the third wire 263 may be wound clockwise along the space between the first outer wall 223 and the first inner wall 222 of the first core part 221 when extending from the phase W1 to the phase W2. Unlike the first and second wires 261 and 262, the third wire 263 may extend along the first core part 221 of the first insulator 220 to connect between the phase W1 and the phase W2. Accordingly, the third wire 263 may be prevented from coming into contact with the first wire 261 and/or the second wire 262.

According to the disclosure, the size of the stator 200 in the axial direction may be reduced. The stator 200 may have U, V, and W phase wires 261, 262, and 263 distributed and arranged on the first insulator 220 and the second insulator 230. For example, the first wire 261 connecting between the phase U1 and the phase U2 and the second wire 262 connecting between the phase V1 and the phase V2 may be wound on the second insulator 230. The third wire 263 connecting between the phase W1 and the phase W2 may be wound on the first insulator 220. The stator 200 may have the first wire 261 and the second wire 262 separately arranged in the vertical direction not to contact each other. For this, the core part 231 of the second insulator 230 may include the first bottom wall 234a and the second bottom wall 234b at different heights.

According to the disclosure, wires may be divided and placed in upper and lower portions of the stator 200 without the need for an extra structure extending in the axial direction of the stator 200. Furthermore, the wires may be placed separately in the vertical direction in an overlapping area, thereby avoiding contacting each other. According to the disclosure, the size of the stator 200 in the axial direction may be reduced. Furthermore, with the reduced size of the stator 200 in the axial direction, the size of the motor 1 in the axial direction may be reduced as well. Accordingly, the motor 1 may become smaller in size.

According to the disclosure, a motor in a reduced size may be provided.

According to the disclosure, a motor having reduced sizes in axial and radial directions may be provided.

According to the disclosure, a motor having a reduced size in an axial direction may be provided by enhancing a wire winding method and a wire supporting structure.

According to the disclosure, a motor having a reduced size in a radial direction may be provided by exposing a portion of a back yoke to the outside of the motor.

Several embodiments of the disclosure have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

What is claimed is:

1. A motor comprising:
   a stator; and
   a rotor arranged outside the stator and configured to be rotated by electromagnetically interacting with the stator,
   wherein the rotor comprises:
      a ring-shaped back yoke including:
         a first sticking projection protruding from an axial surface of the back yoke in an axial direction, and
         a plurality of projections extending from an inner circumferential surface of the back yoke toward a center of the back yoke and arranged separately in a circumferential direction of the back yoke,
      a plurality of magnets separately arranged along the inner circumferential surface of the back yoke, and
      a frame arranged to support the back yoke and the plurality of magnets,
      wherein an outer circumferential surface of the back yoke is exposed to an outside of the frame, the frame includes:
a plurality of columns arranged along a circumference of the frame so as to form a plurality of magnet holes respectively formed between the columns, the plurality of magnet holes facing the inner circumferential surface of the back yoke to respectively receive an inner surface of each of the magnets, and the columns each having a groove in which a projection among the plurality of projections extending from the inner circumferential surface of the back yoke is inserted, and
a second sticking projection protruding in an opposite direction to the first sticking projection from an axial surface of the frame to correspond to the first sticking projection, and
the first sticking projection is arranged to be interlocked with the second sticking projection to prevent the back yoke from being rotated relative to the frame.

2. The motor of claim 1, wherein each of the plurality of projections is arranged between respective adjacent magnets among the plurality of magnets to maintain a predetermined distance between the respective adjacent magnets.

3. The motor of claim 2, wherein a thickness of each of the plurality of projections in a radial direction of the back yoke is smaller than thickness of each of the plurality of magnets in the radial direction of the back yoke.

4. The motor of claim 3, wherein the thickness of each of the plurality of projections is t1 and the thickness of each of the plurality of magnets is t2, and meet the following equation:

$t2/5 < t1 < t2/2$.

5. The motor of claim 1, wherein the rotor further comprises:
a shaft support configured to receive a shaft so as to be fixed to the shaft support to rotate with the rotor, the shaft support also being configured to be mounted to the frame, and
wherein the frame is provided to support the back yoke, the plurality of magnets, and the shaft support.

6. The motor of claim 5, wherein the rotor is integrally formed with the frame being injection molded between the back yoke, the plurality of magnets, and the shaft support.

7. The motor of claim 1, wherein the rotor and the back yoke have a same outside diameter.

8. The motor of claim 1, wherein the stator comprises a stator core, an insulator arranged to cover the stator core, and a plurality of wires wound on the insulator and connected respectively to terminals of phases U, V, and W, and
wherein some of the plurality of wires are wound from a first side of the insulator along an arc-shaped wall formed in a center of the insulator, and some of the plurality of wires are wound from a second side of the insulator, opposite to the first side, along the arc-shaped wall formed in the center of the insulator.

9. The motor of claim 8, wherein the plurality of wires comprise
a first wire connecting a coil of U1 phase terminal to a coil of U2 phase terminal,
a second wire connecting a coil of V1 phase terminal to a coil of V2 phase terminal, and
a third wire connecting a coil of W1 phase terminal to a coil of W2 phase terminal.

10. The motor of claim 9, wherein
the first wire is wound from the first side of the insulator along the arc-shaped wall in a first direction,
the second wire is wound from the first side of the insulator along the arc-shaped wall in a second direction opposite to the first direction, and
the third wire is wound from the second side of the insulator along the arc-shaped wall in the first direction or the second direction.

11. The motor of claim 10, wherein the first wire is arranged separately from the second wire in an axial direction of the motor to avoid contacting the second wire when the first wire is wound from the first side of the insulator along the arc-shaped wall.

12. The motor of claim 11, wherein the insulator comprises a first bottom wall arranged to support the first wire and a second bottom wall arranged to support the second wire, and
wherein the first bottom wall and the second bottom wall are formed to have a step in the axial direction for the first wire and the second wire to be separated in the axial direction.

* * * * *